July 23, 1968  D. O. SMITH  3,393,957
HIGH-FREQUENCY LIGHT MODULATOR OR SWITCH USING THE
MAGNETO-OPTICAL PROPERTIES OF THIN MAGNETIC FILMS
Filed March 2, 1964  2 Sheets-Sheet 1

INVENTOR:
DONALD O. SMITH

BY, Edward D. Thomas
AGENT

INVENTOR:
DONALD O. SMITH

BY, Edward D. Thomas

AGENT

United States Patent Office 3,393,957
Patented July 23, 1968

3,393,957
HIGH-FREQUENCY LIGHT MODULATOR OR
SWITCH USING THE MAGNETO-OPTICAL
PROPERTIES OF THIN MAGNETIC FILMS
Donald O. Smith, Lexington, Mass., assignor to Massachusetts Institute of Technology, Cambridge, Mass., a corporation of Massachusetts
Filed Mar. 2, 1964, Ser. No. 348,453
2 Claims. (Cl. 350—151)

ABSTRACT OF THE DISCLOSURE

An apparatus for the enhancement of the magneto-optical Kerr effect where a magnetic film thinner than the optical penetration depth is positioned by a multilayer dielectric optical network for optimum mode conversion in an optical standing wave, and where a multilayer dielectric optical network is used to match the film properties to free space.

---

Some improvement of the magneto-optical Kerr effect has been reported in the literature by using a dielectric film on top of the magnetic surface as a so-called anti-reflection layer. Reference may be made to "Kerr Magneto-Optic Effect I, II," by P. H. Lissberger, J. Opt. Soc. Am., 51, 948 (1961) for a more complete account of this work. Briefly, the improvement is found to depend critically on the thickness of the dielectric film and on the spectral composition of the illumination. The improvement achieved by this use of an anti-reflection layer has only been of the order of a factor of 10 which is insufficient for general application.

There are numerous present and potential applications for a high-frequency light modulator or switch. For example, the application of lasers to communications requires the modulation of light. In such a broad field of application widely varying modulation requirements occur with respect to parameters such as center frequency, bandwidth, percentage of modulation, and efficiency of modulation. The principal present method of modulation utilizes electro-optical effects in KDP crystals. The present invention has superior properties in many respects to present electro-optical methods of modulation.

A high-speed light switch has immediate application in the area of high-speed photography. Present techniques utilize electro-optical cells or image tubes and produce light pulses several nanoseconds long. The present invention is capable of producing sub-nanosecond pulses at much less cost than current practice which yields pulses several nanoseconds long.

Electronic controllable visual display is dominated at the present time by the cathode-ray tube (CRT). In certain applications two major difficulties with the CRT arise with respect to time persistence and physical size of the display. The exponential time decay of the image on a CRT gives rise to undesirable flicker. Large area CRT displays are difficult to obtain due to the physical problem of making a large CRT, or alternatively, the lack of the requisite light intensity required to project a small CRT image to large size. The present invention is superior to the CRT tube in both of these respects, since there is no decay of light from a magneto-optical light switch, and large area display can be obtained either by directly making a large panel of magnetic film, or projecting a smaller panel illuminated by a high intensity source.

The use of magnetic materials for the storage of digital information is well established. In almost all instances the sensing or read-out of this information is accomplished by detecting induction voltages which appear as a result of some motion of the magnetic field representing the stored information. In any digital computer memory scheme it is usually desired to extend the bit density or the total amount of information stored in a given volume and the speed of operation as far as possible. Sensing problems often contribute to limitations on memory size and speed of operation. If less magnetic material is used in order to secure high bit density, then there is loss of inductive signal strength; and high operating speed aggravates the signal-to-noise problem by introducing transient voltage into the sensing circuit from the various selection circuits. Consequently, a method of sensing magnetic data storage has been sought which is more sensitive than the inductive method and which can be decoupled from the noise generated by the energy required to switch the memory array. In principle magneto-optical sensing has the capacity to solve the decoupling problem as a direct result of the wide frequency difference between the memory switching currents and the optical light source. In the past, however, the sensitivity of the magneto-optical method has been found to be so poor as to make any broad application impractical.

Optical reflection problems not involving gyrotropic media are characterized by two non-interacting polarization modes. If a beam of incident light of arbitrary polarization is resolved into two components, one being parallel and the other perpendicular to the plane of incidence, it is well known that on reflection from a non-magnetic surface the two components do not interact. Parallel polarization remains parallel and perpendicular polarization remains perpendicular. The salient feature of magneto-optical reflection is that these modes interact with a conversion of energy from one mode to the other. Mode conversion effects on reflection from a magnetic material are often loosely designated as Kerr magneto-optical effects.

It is the primary purpose of the present invention to improve the basic conversion efficiency, and hence the sensitivity, of magneto-optical mode conversion. The basic teaching of this invention is how to solve the following two problems, and hence obtain enhanced conversion efficiency, namely:

(1) Increase the degree of interaction between a light wave impinging on the magnetic material and the mode conversion properties of the material. This problem has some of the features of conventional impedance matching but differs therefrom in significant respects and will be referred to as the problem of conversion matching. Conversion matching can be accomplished by the use of multilayer dielectrics.

(2) In the case of metallic or semiconducting magnetic materials, ohmic or conductivity loss in the magnetic material must be eliminated or reduced by many orders of magnitude. This problem can be solved by correctly positioning the magnetic material, which is in the form of a thin film of thickness much less than the optical penetration depth, in an optical standing wave of high standing-wave-ratio (SWR).

These and other features and advantages of the invention will be apparent from the following detailed description taken together with the accompanying drawing in which.

Figure 1:
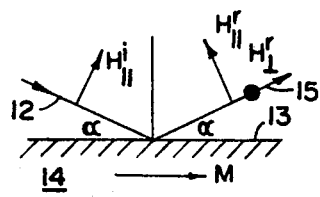
FIGURE 1 illustrates the reflection of polarized light from a magnetic surface.

In FIGURE 1 a beam of light 12 is shown, polarized into a mode having H parallel to the plane of incidence as shown by the component $H_{\parallel}^i$, and incident upon surface 13 of magnetic material 14 having magnetization M lying in the plane of the surface 13 and along the direction of incident light propagation. The magneto-optical Kerr interaction will cause the reflected beam 15 to have both a component $H_{\parallel}^r$ and a component $H_{\perp}^r$.

Figure 2:
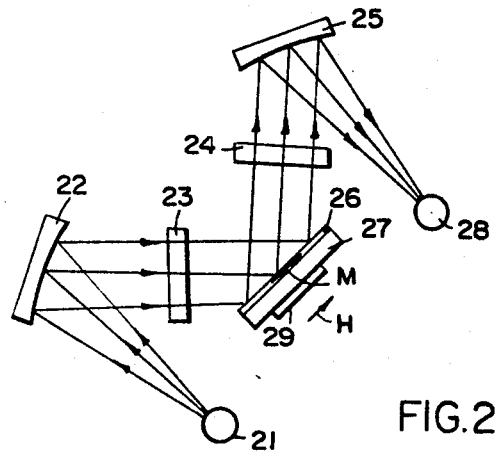
FIGURE 2 illustrates schematically one method of measuring the Kerr magneto-optical effect.

FIGURE 2 illustrates schematically one method of measuring the magneto-optical Kerr effect. Here a tungsten lamp 21 serves as a light source. Concave mirror 22 collimates the light from source 21 into a beam of parallel rays which pass through a polarizing element 23, such as a dichroic sheet set with its transmission plane at right angles to the plane of incidence, before reaching magnetic film 26 mounted on one surface of substrate 27. The beam of light reflected from the surface of the magnetic film 26 passes through a second polarizing element 24, also a dichroic sheet set with its transmission plane at almost a right angle to that of element 24, to a second concave mirror 25 which focuses the reflected beam of light on a detector 28, which may be a photomultiplier tube. The orientation of the transmission planes of both the polarizing elements 23 and 24 is made adjustable by means of micrometer mountings (not shown).

The film 26 is magnetized by means of current flowing in a direction at right angles to the plane of incidence in a conductor 29 mounted on the rear surface of substrate 27. If alternating current of frequency $f$ is supplied, a sinusoidally varying magnetic field of frequency $f$ is applied to film 26, as indicated by vector H. The magnetization of film 26 and hence the Kerr interaction is then a periodic time function of period $1/f$ as film 26 is driven to saturation in both directions of magnetization.

The luminous flux per unit area transmitted by two polarizing elements is approximately proportional to $\cos^2 \theta$, where $\theta$ is the angle between their transmission planes; when the elements are crossed ($\theta = 90°$) the transmitted flux is ideally zero. The effect of the magneto-optical Kerr interaction can be considered to be a change in $\theta$. The size of the Kerr effect is obtained by following the changes in A.C. and D.C. components of the photomultiplier current as the angle between the polarizing element's transmission planes is rotated by micrometer adjustment.

If the longitudinal Kerr coefficients are defined as:

$$k_{\perp} = \frac{H_{\parallel}^r}{H_{\perp}^i}$$

$$k_{\parallel} = \frac{H_{\perp}^r}{H_{\parallel}^i}$$

Then for metallic ferromagnets, such as iron, cobalt, nickel and their alloys, values of $k$ measured as illustrated in FIGURE 2 are typically found of the order of $10^{-4}$. Since the energy conversion efficiency from one state of polarization to the other is given by the square of the Kerr coefficients, the conversion efficiency is thus only of the order of $10^{-8}$. The small size of the effect, described above, has been a severe limitation on applications of the Kerr effect.

The conversion efficiency $w$ is defined as:

$$w = w_2^r / w_1^i \qquad (1)$$

where $w_1^i$ is the incident energy in mode 1 and $w_2^r$ is the reflected energy in mode 2.

Then $$w_1^i = w_1^r + w_2^r + w_\Omega$$

where $w_1^r$ is the reflected energy in mode 1 and $w_\Omega$ is the ohmic loss from both modes, principally from mode 1. For simplicity, it is assumed that all of the incident energy is reflected and that there is no transmitted energy of either mode. In order to maximize the conversion efficiency $w$, all of the incident energy should interact with the magnetic medium in the sense that $w_1^r = 0$; in which case an upper bound on $w$ is given by:

$$w \lesssim \frac{w_2^r}{w_\Omega} \qquad (2)$$

which states that the conversion efficiency is determined by the division of incident energy between ohmic loss and converted energy.

If the magnetic material is a sheet of metal of thickness comparable to the optical penetration depth, an upper bound on $w$ can be calculated for reflection at normal incidence and with the magnetization perpendicular to the reflecting surface (polar orientation) which is found to be:

$$w_p \lesssim \frac{|g|^2}{4} \sim 2 \times 10^{-5} \qquad (3)$$

where the subscript $p$ indicates the polar effect and the gyrotropic constant $g$ has been taken as $|g| \sim 10^{-2}$.

However, many cases of interest require the magnetization to lie in the plane of the reflecting surface (longitudinal orientation) and $w$ is then reduced due to complications introduced by the consequent required oblique incidence of the incident light.

As a result $$w_L \lesssim \frac{|g|^2}{4(n')^2} \sim 2 \times 10^{-6} \qquad (4)$$

where the subscript L indicates longitudinal orientation of the magnetization and $n'$ is the real part of the index of refraction, taken typically $\sim 3$. Experimental values of $w_L$ of the order estimated above have been reported in the literature by Lissberger, cited above.

Figure 3:
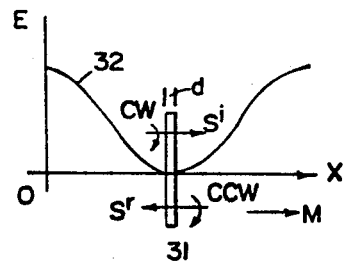
FIGURE 3 illustrates diagrammatically the effect of the presence of a magnetic film placed at a node of the electric field of an optical standing wave.

Higher values of $w$ can be obtained with magnetic metals if the metal is in the form of a film much thinner than the optical penetration depth. Referring to FIGURE 3, consider the normal-incidence polar-effect in which a magnetic film 31 of thickness $d \ll$ penetration depth is placed at an electric field node in an optical standing wave 32. The average of the magnitude of the electric field E clearly goes to zero faster than $d$ and calculation shows $E \alpha d^3$, which comes from the second term in the expansion of a sine function; therefore the ohmic loss $w_\Omega \alpha d^6$. Furthermore, the converted or rotated energy is proportional to a lower power of $d$ than the ohmic loss. Thus, if the standing wave 32 is considered as two traveling waves with propagation vectors $S^i$ and $S^r$, where $i$ and $r$ refer to incident and reflected waves, respectively, then the total electric field is obtained by algebraic addition of two nearly equal-magnitude but opposite-sign traveling-wave fields. In other words, the field responsible for ohmic loss tend to cancel each other. However, this is not true for the rotated electric fields which give mode conversion. From FIGURE 3, the rotation viewed along S of $S^i$ will be clockwise (CW) and that of $S^r$ counter-clockwise (CCW), which viewed from one direction are rotations in the same sense. Since the rotation is non-reciprocal, the effects of the two traveling waves do not cancel, and calculation shows that the rotated field $E_{\text{rotated}} \alpha d$ and that $w_{\text{rotated}} \alpha d^2$.

It was pointed out earlier (Equation 2) that the conversion efficiency is determined by the division of incident energy between ohmic loss and converted energy. Hence, in theory, the normal-incidence polar effect can be made to approach unity by taking $d$ sufficiently small. The discussion has been simplified by considering only normal incidence. The oblique-incidence required when the magnetization is in the plane of the film introduces complications which will be discussed later.

Two further difficulties remain, namely: the practical realization of a sufficiently perfect mirror and conversion matching from free space to the conversion properties of the magnetic film. The best presently known mirror would be made of silver, and calculation shows that such a mirror would not be sufficiently perfect (i.e., lossless) to set up an optical standing wave with a sufficiently high standing wave ratio (SWR) (the standing wave of FIGURE 3 is idealized and has a SWR of ∞). However, a higher SWR can be obtained by increasing the impedance mismatch from free space to the silver mirror by the use of multilayer dielectric films. Normally such multilayers are used to effect impedance match, but the opposite result can be obtained easily. By the proper use of multilayer dielectric films conversion matching of the magnetic film to free space can also be accomplished.

Figure 4:
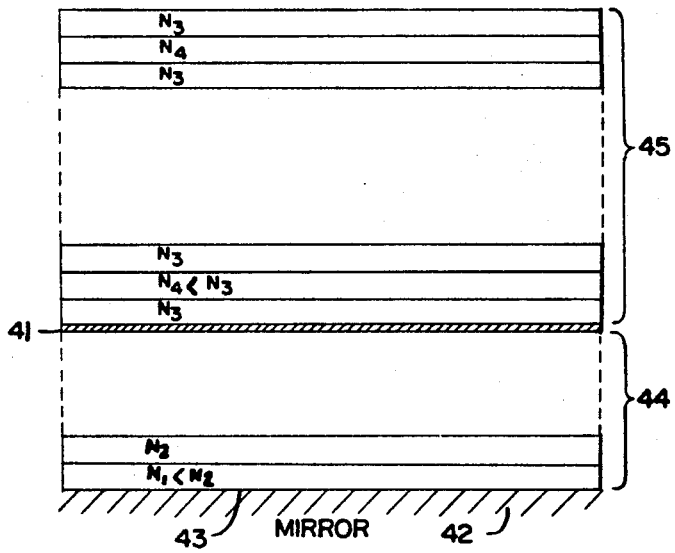
FIGURE 4 represents one embodiment of the multilayer film structure.

Impedance matching problems with dielectric films do not have a unique solution, and, likewise, neither do impedance mismatching problems. A common technique is to use alternate quarter-wave layers of high and low index-of-refraction materials (HL layers). If impedance step-up is desired the sequence starting from the bottom is HL and conversely for step-down, LH. Since in this case it is desired to reduce the impedance of the mirror, a sequence LH is required, as indicated in FIGURE 4. Here a very thin film 41 of magnetic material is shown spaced from the silver mirror surface 43 of substrate 42 by a multilayer film structure 44. Structure 44 is made up of alternate quarter wave layers of dielectric materials having indices of refraction $n_1$ and $n_2$ ($n_1 < n_2$), respectively, to produce an impedance mismatch, for example cryolite and titanium dioxide with indices 1.3 and 2.8, respectively. The number of layers is determined by the desired value of SWR. This structure 44 serves to position a metallic magnetic film 41 at an electric node of an optical standing wave of high SWR.

Figure 5A:
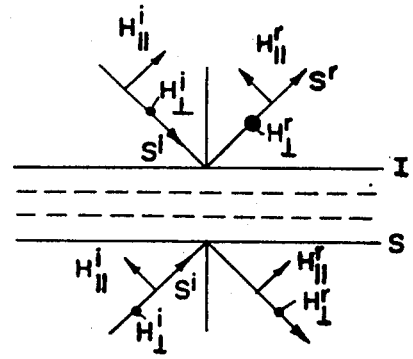
FIGURE 5 is an illustration of the analogy between the reflection and transmission from a thin magnetic film and a four-port microwave network.
Figure 5B:
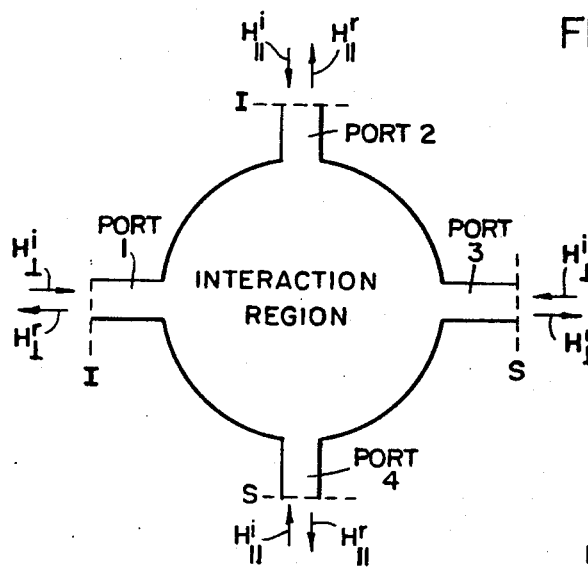

As in the case of impedance matching, there is no unique solution to the problem of conversion matching with dielectric films. However, before discussing possible structures which can accomplish conversion matching, it is useful to point out wherein the problem is different from impedance matching. To this end, note that the reflection and transmission behavior of a thin magnetic film can be considered as analogous to the behavior of a general 4-port electrical or microwave network. The analogy is made clear in FIGURE 5. In FIGURE 5a a general dielectric and magnetic film structure having external boundaries I and S is shown with both ⊥ and ∥ modes radiation incident on boundaries I and S. The related 4-port is shown in FIGURE 5b; if boundary S is a mirror the ports are taken as short circuits. It then follows from the theory of such networks that the reflection coefficients of the two modes $$\left(r_\perp = \frac{H_\perp^r}{H_\perp^i} \text{ and } r_\| = \frac{H_\|^r}{H_\|^i}\right)$$

are not independent of each other. For example, if there is no dissipation in the structure and the Kerr reflection coefficient $k_\perp = H_\|^r / H_\perp^i = 1$, then $r_\perp = 0$ and also $r_\| = 0$. This lack of independence of $r_\perp$ and $r_\|$ implies that any quantity defined as a conversion impedance cannot be a constant of the magnetic material, but will vary as any specific film structure is varied. Since the usefulness of the impedance concept depends on being able to characterize a material with a unique value of impedance, it is clear that the problem of conversion matching is qualitatively different from conventional impedance matching.

A direct appeal to the theory of magneto-optical mode conversion (Magneto-optical Properties of Multilayer Films, D. O. Smith, M. I. T. Lincoln Laboratory Group Report No. 24L-0002, September 3, 1963) gives one possible solution to conversion matching, as shown in FIGURE 4. The film structure 45 consists of triple layers of dielectric films of indices $n_3$, $n_4$ and $n_3$ ($n_4 < n_3$), respectively. The layers are not quarter wave at the final operating wavelength, but rather at some nearby wavelength. In practice the layers could be made quarter wave at a selected fabrication frequency and then subsequent measurement of the mode conversion would indicate the best final operating wavelength. The number of triple layers required will depend on specific details such as operating wavelength, magnetic materials used, and dielectrics used.

The conversion matching structure 45 is not necessarily an optimum one, and is certainly not the only one. However, other matching structures can be considered as merely refinements of the basic idea of conversion matching as embodied in this invention and the above-cited theory of magneto-optical behavior of multilayer films.

Figure 6A:
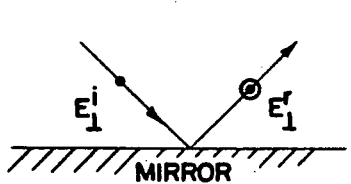
FIGURES 6a through 6c illustrate the problem of ohmic loss at oblique incidence.
Figure 6B:
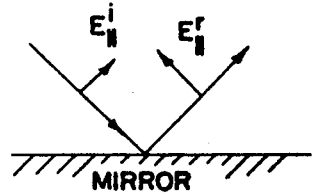
Figure 6C:
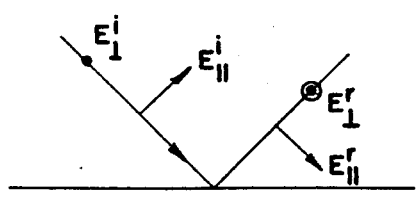

The case of oblique-incidence of the incident light, as would be required if the magnetization M were in the plane of the film, is somewhat more complicated than the normal incidence. The problem of ohmic loss at oblique incidence can be understood by referring to FIGURE 6. At the surface of a mirror the tangential electric field is necessarily zero, but the normal field is not necessarily zero. Thus, for the $E_\perp$ mode a standing wave having zero E at the mirror surface will occur (FIGURE 6a); however, the standing wave generated by the $E_\|$ mode has a maximum in E at the mirror surface, as indicated in FIGURE 6b. This problem can be overcome by proper modification of the mismatching dielectric structure discussed above. Thus, if the proper dielectric layers are applied, not only can mismatch be achieved, but the phase of $E_\|^r$ relative to $E_\|^i$ can be changed by 180 degrees at the same time so that the normal component of $E_\perp^i$ and $E_\perp^r$ are out of phase (FIGURE 6c). Under these conditions, and at large angles of incidence both modes will now possess an electric node at the same place, and placement of a magnetic metallic film at this position will greatly reduce ohmic loss.

Conversion matching at oblique incidence is in general more complicated than at normal incidence due to the fact that two different matching conditions corresponding to the two modes are now imposed. One solution is to reduce the oblique-incidence problem to the normal incidence one by a proper choice of indices $n_3$ and $n_4$. This can be accomplished if in addition to the condition $n_4 < n_3$, it is also required that $n_3$ and $n_4 \lesssim 2$. Materials such as Ge or Si, which have $n \cong 4$ at wavelengths of $1\mu$ would be suitable for use as the $n_3$ material. Again, this solution to the conversion matching problem is not necessarily optimum, and further refinements can be expected by application of the above cited theory.

From the foregoing discussion, the preferred structure for the enhancement of the magneto-optical Kerr effect for metallic magnetic surfaces can be described as having a very thin metallic magnetic film, thinner than the optical penetration depth, supported by an optical substrate having a mirror surface of silver and a mismatching and phase adjusting dielectric-film network, and all coupled to free space by a multilayer dielectric film optical conversion matching network in which alternate layers possess different indices of refraction and thicknesses related to the wavelength of the incident radiation.

The manufacturing techniques necessary to produce substrates of optical quality are well known. Likewise the vacuum deposition of thin films on substrates to produce mirror surfaces and metallic films having predetermined magnetic properties is well established. Further, the commercial manufacture of multiple layer films for optical purposes, such as filters, in which the thickness of the individual films is precisely monitored to produce specified properties, is well attested. Consequently, once decisions have been made, such as wavelength of incident radiation, angle of incidence, and required enhancement and the specifications for the several layers determined, the construction of a specific structure, as illustrated in FIGURE 4 is within the scope of those skilled in the art of optical film devices. The book Optical Properties of Thin Solid Films by O. S. Heavens, Butterworth's Scientific Publications, London, 1955, contains information concerning manufacturing methods and controls.

An example of one method of using the enhanced magneto-optical Kerr effect to sense magnetically stored data will be cited which utilizes the difference between the transverse and longitudinal magneto-optical coupling. Referring again to FIGURE 2, consider that film 26 represents a single memory cell which has been magnetized in the "zero" state to have a remanent magnetization lying in the plane of the film in the direction of the arrow M and that this corresponds to the longitudinal orientation with respect to the incident beam of light. Now if a current pulse is applied to conductor 29 of sufficient intensity to switch the magnetization of film 26 to the opposite longitudinal direction or "one" state by rotation in the plane of the film, then the magnetization must pass through an intermediate state which corresponds to the transverse orientation, M perpendicular to the plane of the paper in which there is no mode conversion. Hence, a pulse of light will be generated during the switching operation and the initial presence of a zero in the cell is indicated. If a "one" is initially present, switching to the "one" state has no effect on the magnetization and hence the absence of a light pulse signifies the presence of a one.

A second example of the use of the enhanced magneto-optical Kerr effect to sense magnetically stored data takes advantage of the fact that during the rotational switching of a magnetic film, the magnetization M lifts slightly out of the plane of the film. Then, since there is a component of M perpendicular to the film plane, normal incidence illumination can be used with the advantages of more complete elimination of ohmic loss by using a thin enough magnetic film. In this case, however, more impedance mismatching and conversion matching layers will be required than when using the longitudinal effect due to the reduced thickness of magnetic film and to the reduced effective mode conversion properteis of the magnetic film due to the small component of M which is perpendicular to the film plane. The actual sensing can again be described by reference to FIGURE 2 with the understanding that the illumination is now vertical. Then film 26 represents a single memory cell which has been magnetized in the "zero" state to have a remanent magnetization lying in the plane of the film in the direction of the arrow M. Now if a current pulse is applied to conductor 29 of sufficient intensity to switch the magnetization M of film 26 to the opposite direction or "one" state by rotation, then during this rotation M lifts slightly out of the plane of the film and a pulse of light will be generated during the switching operation and the initial presence of a zero in the cell is indicated. If a "one" is initially present, switching to the "one" state has no effect on the magnetization and hence the absence of a light pulse signifies the presence of a one.

Optical read-out in this fashion is well suited to serial access read-out in which a tape or drum can carry the multiple layer thin film structures past a read-out station. In this application a high coercive force magnetic film material is desirable in order to achieve the highest possible density of stored information.

For random access memory application, cells at many regions of space must be read. In comparatively small memory arrays a single large area illuminator and a single detector can be used. For large memory arrays selective illumination of a selected cell or groups of cells and a plurality of detectors may be advantageous.

In addition to the sensing of magnetic data storage, the above described apparatus is adaptable readily to the applications of high frequency light modulation and high-speed light switch. It also follows that the present invention can be arranged into a large area display either by a large panel of magnetic film or by a composite array of small elements or by projecting a small panel illuminated by a high intensity source.

In much of the foregoing discussion the magnetic film has been assumed to be metallic. However, the scope of this invention is not to be so limited. The use of non-metallic magnetic films, such as ferrites, has the advantage that with such materials there is no ohmic loss, and, therefore, a comparable conversion efficiency can be obtained with a thicker magnetic film. This would reduce or eliminate the problem of mismatching the mirror and providing for the phase shift and high angle-of-incidence described above. Furthermore, a non-metallic magnetic film need not necessarily be placed at an electric node, and in fact could be placed at an electric maximum. For some magnetic materials such placement would be advantageous due to the specific types of mode interaction which are possible in different materials. While manufacturing techniques for the production of extremely thin ferrite films are not as well advanced as that for metals, it is within the scope of present methods to produce useful films.

Modifications of the structures described herein will be apparent to those skilled in the art without departing from the inventive concepts. Consequently, the invention is to be construed as limited only by the spirit and scope of the appended claims.

What is claimed is:
1. Multilayer thin film apparatus for use with incident polarized light to enhance the various Kerr magneto-optical effects comprising:
   a substrate having a mirror surface of high reflectivity to produce an optical standing wave,
   a multilayer dielectric film optical network coating said mirror surface, said network being made up of alternate quarter wave films of materials having different refractive indices, $n_1$ and $n_2$ where $n_1 < n_2$ and the initial layer on said mirror surface is film $n_1$,
   a film of magnetized metal much thinner than the optical penetration depth and positioned in said network at an electric node of said standing wave to minimize optical ohmic loss,
   the portion of said network lying between said magnetized film and said mirror surface serving to increase the standing wave ratio of the optical wave and the remainder of said network serving to couple the mode conversion properties of said magnetized film to the incident light.
2. The apparatus as defined in claim 1 for use at oblique incidence wherein said optical network is arranged to cause nodes of both the parallel and perpendicular modes of polarization to occur at the same place by fabricating the quarter wave films at a selected wavelength differing from the wavelength of the incident light by a predetermined measured amount.

References Cited
UNITED STATES PATENTS

| | | | |
|---|---|---|---|
| 3,142,720 | 7/1964 | Adams | 350—151 |
| 3,158,673 | 11/1964 | Sites | 350—151 |
| 3,224,333 | 12/1965 | Kolk | 350—151 |

OTHER REFERENCES

Young, "Synthesis of Multiple Antireflection Films Over A Prescribed Frequency Band," J. Opt. Soc. Am., vol. 5, No. 9, pp. 967–974 (September 1961).

DAVID SCHONBERG, *Primary Examiner.*

P. R. MILLER, *Assistant Examiner.*